United States Patent
Lee et al.

(10) Patent No.: US 10,784,706 B2
(45) Date of Patent: Sep. 22, 2020

(54) WIRELESS POWER TRANSMITTER AND METHOD FOR CONTROLLING THE SAME

(71) Applicants: Samsung Electronics Co., Ltd., Suwon-si, Gyeonggi-do (KR); SEOUL NATIONAL UNIVERSITY R&DB FOUNDATION, Seoul (KR)

(72) Inventors: Chong-Min Lee, Seoul (KR); Seong-Cheol Kim, Seoul (KR); Dae-Hyun Kim, Incheon (KR); Sang-Wook Lee, Suwon-si (KR); Young-Ho Ryu, Yongin-si (KR); Byeong-Ho Lee, Seoul (KR); Seong-Wook Lee, Seoul (KR); Young-Jun Yoon, Seoul (KR)

(73) Assignees: Samsung Electronics Co., Ltd., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 314 days.

(21) Appl. No.: 15/977,501

(22) Filed: May 11, 2018

(65) Prior Publication Data

US 2019/0052114 A1    Feb. 14, 2019

Related U.S. Application Data

(60) Provisional application No. 62/544,354, filed on Aug. 11, 2017.

(30) Foreign Application Priority Data

Dec. 20, 2017   (KR) .................. 10-2017-0175911

(51) Int. Cl.
*H02J 7/00* (2006.01)
*H02J 7/02* (2016.01)
(Continued)

(52) U.S. Cl.
CPC .............. *H02J 7/025* (2013.01); *H02J 50/27* (2016.02); *H02J 50/40* (2016.02); *H02J 50/80* (2016.02); *H02J 50/90* (2016.02)

(58) Field of Classification Search
CPC .. H02J 7/025; H02J 50/80; H02J 50/90; H02J 50/27; H02J 50/40; H02J 7/0068;
(Continued)

(56) References Cited

U.S. PATENT DOCUMENTS 5,959,573 A * 9/1999 Krikorian ............... G01S 7/288
                                                              342/195
2016/0072334 A1* 3/2016 Wu .......................... H02J 7/025
                                                              320/108

(Continued)

FOREIGN PATENT DOCUMENTS

| JP | 07-159523 A | 6/1995 |
|---|---|---|
| KR | 10-2015-0109871 A | 10/2015 |
| KR | 10-2015-0109882 A | 10/2015 |

*Primary Examiner* — Arun C Williams
(74) *Attorney, Agent, or Firm* — Jefferson IP Law, LLP

(57) ABSTRACT

A wireless power transmitter configured to wirelessly transmit power to an electronic device is provided. The wireless power transmitter includes a power transmission antenna including a plurality of patch antennas for wirelessly transmitting power, a sensor, and a processor, wherein the processor may be configured to create a first clutter map representing a reflection characteristic of an object positioned around the wireless power transmitter based on, at least, first data obtained by the sensor during a first period, store the first clutter map, compare a difference between the first clutter map and second data obtained by the sensor during a second period with data contained in the first clutter map, create a second clutter map corresponding to the second period based on a result of the comparison, determine a position of an organism using the second data and the second clutter map, and control the power transmission
(Continued)

antenna such that a magnitude of the RF wave is less than a predetermined value based on the position of the organism.

22 Claims, 10 Drawing Sheets

(51) Int. Cl.
*H02J 50/27* (2016.01)
*H02J 50/80* (2016.01)
*H02J 50/90* (2016.01)
*H02J 50/40* (2016.01)

(58) Field of Classification Search
CPC ......... H02J 7/022; H02J 7/0073; Y02E 60/12; H01M 10/44
See application file for complete search history.

(56) References Cited

U.S. PATENT DOCUMENTS

| | | | |
|---|---|---|---|
| 2016/0318413 A1* | 11/2016 | Roehrl | B60L 11/1829 |
| 2017/0085297 A1* | 3/2017 | Gao | H02J 50/80 |
| 2017/0141614 A1* | 5/2017 | Lee | B60L 53/12 |
| 2017/0155280 A1* | 6/2017 | Okamoto | H02J 7/025 |
| 2017/0288738 A1 | 10/2017 | Lee et al. | |
| 2019/0139701 A1* | 5/2019 | Liang | H02J 50/00 |
| 2019/0140481 A1* | 5/2019 | Keeling | H02J 50/60 |

\* cited by examiner

WIRELESS POWER TRANSMITTER AND METHOD FOR CONTROLLING THE SAME

CROSS-REFERENCE TO RELATED APPLICATION(S)

This application is based on and claims priority under 35 U.S.C. § 119(e) of a U.S. Provisional application Ser. No. 62/544,354, filed on Aug. 11, 2017, in the U.S. Patent and Trademark Office, and under 35 U.S.C. § 119(a) of a Korean patent application number 10-2017-0175911, filed on Dec. 20, 2017, in the Korean Intellectual Property Office, the disclosure of each of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd., and 2) Seoul National University R&DB Foundation.

TECHNICAL FIELD

The disclosure relates to wireless power transmitters and methods for controlling the same. More particularly, the present disclosure relates to wireless power transmitters capable of wirelessly transmitting power to electronic devices and methods for controlling the same.

BACKGROUND

Portable digital communication devices have become must-have items for modern people. Customers desire to receive various high-quality services anytime, anywhere. The recent development of Internet of Thing (IoT) technology integrate various sensors, home appliances, and communication devices into a single network. A diversity of sensors require a wireless power transmission system for seamless operations.

Wireless power transmission may come in various types, such as magnetic induction, magnetic resonance, and electromagnetic waves, among which the electromagnetic wave type may advantageously work for remote power transmission as compared with the others.

Wireless power transmitters coming in the electromagnetic wave scheme, after locating a target to be charged, e.g., an electronic device, may produce radio frequency (RF) waves towards the corresponding position. Wireless power transmitters may produce RF waves with a relatively high frequency (e.g., 5.8 GHz). Wireless power transmitters may generate RF waves of a relatively large magnitude for remote charging. RF waves produced from a wireless power transmitter may be applied to a human, animal, or other organism positioned near the wireless power transmitter. RF waves may be harmful to living organisms.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for wireless transmission of power to an electronic device.

In accordance with an aspect of the disclosure, a wireless power transmitters capable of locating an organism by comparing a clutter map, which is updated at each cycle, with signals received, thereby performing control to avoid relatively strong RF waves from being applied to the determined location of the organism and methods for operating the same is provided.

In accordance with an aspect of the disclosure, a wireless power transmitter configured to wirelessly transmit power to an electronic device is provided. The wireless power transmitter includes a power transmission antenna including a plurality of patch antennas for wirelessly transmitting power based on a radio frequency (RF) wave, a sensor, and a processor, wherein the processor may be configured to create a first clutter map representing a reflection characteristic of an object positioned around the wireless power transmitter based on, at least, first data obtained by the sensor during a first period, store the first clutter map, compare a difference between the first clutter map and second data obtained by the sensor during a second period with data contained in the first clutter map, create a second clutter map corresponding to the second period based on a result of the comparison, determine a position of an organism using the second data and the second clutter map, and control the power transmission antenna such that a magnitude of the RF wave is less than a predetermined value based on the position of the organism.

In accordance with another aspect of the disclosure, a method for operating a wireless power transmitter configured to wirelessly transmit power to an electronic device is provided. The method includes creating a first clutter map representing a reflection characteristic of an object positioned around the wireless power transmitter based on, at least, first data obtained during a first period, storing the first clutter map, comparing a difference between the first clutter map and second data obtained during a second period with data contained in the first clutter map and creating a second clutter map corresponding to the second period based on a result of the comparison, determining a position of an organism using the second data and the second clutter map, and producing an RF wave for charging the electronic device such that a magnitude of the RF wave is less than a predetermined value based on the position of the organism.

In accordance with another aspect of the disclosure, an apparatus for a locator configured to determine a position is provided. The apparatus includes of a target a first antenna configured to transmit a first transmit signal, a second antenna configured to receive a first receive signal formed by reflection of the first transmit signal, and a processor, wherein the processor may be configured to create a first clutter map representing a reflection characteristic of an object positioned around the locator based on, at least, first data obtained through the second antenna during a first period, store the first clutter map, compare a difference between the first clutter map and second data obtained through the second antenna during a second period with data contained in the first clutter map, create a second clutter map corresponding to the second period based on a result of the comparison, and determine the position of the target using the second data and the second clutter map.

In accordance with an embodiment of the disclosure, a method for operating a locator configured to determine a position is provided. The of a target method includes creating a first clutter map representing a reflection characteristic of an object positioned around a locator based on, at least, first data obtained during a first period, comparing a difference between the first clutter map and second data obtained during a second period with data contained in the first clutter map and creating a second clutter map corresponding to the second period based on a result of the comparison, and determining the position of the target using the second data and the second clutter map.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
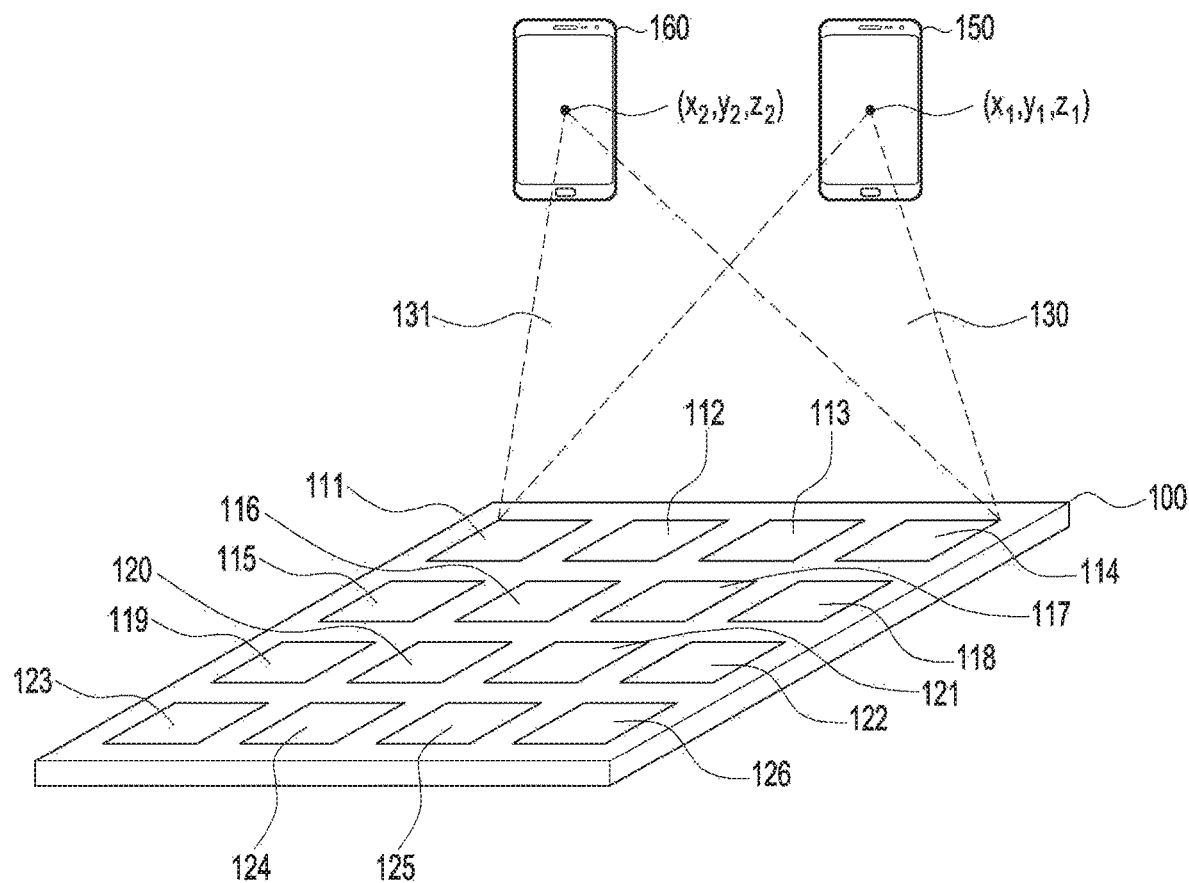
FIG. 1 is a concept view illustrating a wireless power transmission system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

For example, examples of the wireless power transmitter or electronic device according to embodiments of the disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad), or a body implantable device. In some embodiments, examples of the wireless power transmitter or electronic device may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a media box, a gaming console, an electronic dictionary, an electronic key, a camcorder, or an electronic picture frame.

According to an embodiment of the disclosure, the wireless power transmitter or the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the wireless power transmitter or electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the disclosure, the wireless power transmitter or electronic device may be flexible or may be a combination of the above-enumerated electronic devices. According to an embodiment of the disclosure, the wireless power transmitter or electronic device is not limited to the above-listed embodiments. As used herein, the term "user" may denote a human using the electronic device or another device (e.g., an artificial intelligent electronic device) using the wireless power transmitter or electronic device.

FIG. 1 is a concept view illustrating a wireless power transmission system according to an embodiment of the disclosure.

The wireless power transmitter 100 may wirelessly transmit power to at least one electronic device 150 or 160. As used herein, "wireless power transmitter 100 or electronic device 150 performs a particular operation" may mean, e.g., that a processor included in the wireless power transmitter 100 or electronic device 150 performs a particular operation or controls other hardware to perform a particular operation. As used herein, "wireless power transmitter 100 or electronic device 150 performs a particular operation" may mean, e.g., that a processor performs a particular operation or controls other hardware to perform a particular operation as per execution of at least one command stored in a memory included in the wireless power transmitter 100 or electronic device 150. According to an embodiment of the disclosure, the wireless power transmitter 100 may include a plurality of patch antennas 111 to 126. The patch antennas 111 to 126 are not limited as long as they each are an antenna capable of producing RF waves. At least one of the amplitude and phase of RF waves produced by the patch antennas 111 to 126 may be adjusted by the wireless power transmitter 100. For ease of description, the RF waves respectively generated by the patch antennas 111 to 126 are denoted sub-RF waves.

According to an embodiment of the disclosure, the wireless power transmitter 100 may adjust at least one of the amplitude or phase of each of the sub-RF waves generated by the patch antennas 111 to 126. Meanwhile, the sub-RF waves may interfere with one another. For example, the sub-RF waves may constructively interfere with one another at one point or destructively interfere at another point. According to an embodiment of the disclosure, the wireless power transmitter 100 may adjust at least one of the amplitude or phase of each of the sub-RF waves generated by the patch antennas 111 to 126 so that the sub-RF waves may constructively interfere with one another at a first point (x1, y1, z1).

For example, the wireless power transmitter 100 may determine that the electronic device 150 is positioned at the first point (x1, y1, z1). Here, the position of the electronic device 150 may be where, e.g., a power receiving antenna of the electronic device 150 is located. A configuration in which the wireless power transmitter 100 determines the position of the electronic device 150 is described below in greater detail. In order for the electronic device 150 to wirelessly receive power at a higher transmission efficiency, the sub-RF waves 130 should constructively interfere with one another at the first point (x1, y1, z1). Accordingly, the wireless power transmitter 100 may control the patch antennas 111 to 126 so that the sub-RF waves may constructively interfere with one another at the first point (x1, y1, z1). Here, controlling the patch antennas 111 to 126 may mean controlling the magnitude of signals inputted to the patch antennas 111 to 126 or controlling the phase (or delay) of signals inputted to the patch antennas 111 to 126. Meanwhile, beamforming, a technique for controlling RF waves to be subject to constructive interference at a certain point, would readily be appreciated by one of ordinary skill in the art. It is also appreciated by one of ordinary skill in the art that the beamforming used herein is not particularly limited in type. For example, various beamforming methods may be adopted as disclosed in U.S. Patent Application Publication No. 2016/0099611, U.S. Patent Application Publication No. 2016/0099755, and U.S. Patent Application Publication No. 2016/0100124, each of which is hereby incorporated by reference in its entirety. A RF wave formed by beamforming may be denoted a pocket of energy.

For example, the wireless power transmitter 100 may detect that the electronic device 160 is positioned at the second point (x2, y2, z2). The wireless power transmitter 100 may control the patch antennas 111 to 126 so that the sub-RF waves may constructively interfere with one another at the second point (x2, y2, z2) in order to charge the electronic device 160. Hence, a RF wave 131 formed by the sub-RF waves may have the maximum amplitude at the second point (x2, y2, z2), and thus, the electronic device 160 may receive power at a higher efficiency.

As set forth above, the wireless power transmitter 100 may determine the position of the electronic devices 150 and 160 and enable the sub-RF waves to constructively interfere with one another at the determined position, allowing for wireless charging at a higher transmission efficiency. Meanwhile, the wireless power transmitter 100 may be capable of high-transmission efficiency wireless charging only when it can exactly grasp the position of the electronic devices 150 and 160.

Figure 2:
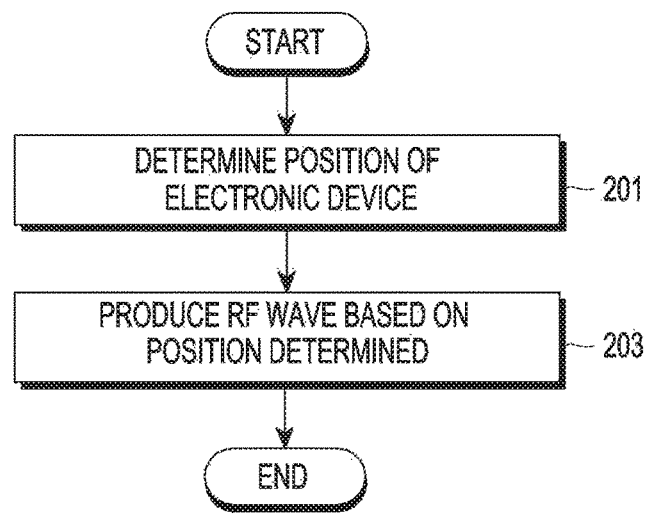
FIG. 2 is a flowchart illustrating a method for operating a wireless power transmitter according to an embodiment of the disclosure.

FIG. 2 is a flowchart illustrating a method for operating a wireless power transmitter according to an embodiment of the disclosure.

According to an embodiment of the disclosure, a wireless power transmitter 100 may determine the position of at least one of an electronic device (e.g., the electronic device 150 or 160) or an organism in operation 201. The wireless power transmitter 100 may determine the position of at least one of an electronic device or organism based on, at least, data entered from various sensors. According to an embodiment of the disclosure, the wireless power transmitter 100 may determine the position of at least one of an electronic device or organism based on data obtained through at least one transceiver. The wireless power transmitter 100 may determine the position of an electronic device using one sensor and the position of an organism using another sensor. For example, the wireless power transmitter 100 may determine the position of an organism based on data obtained through at least one transceiver. The wireless power transmitter 100 may produce transmit waves through one transceiver and receive waves corresponding to the transmit waves. The wireless power transmitter 100 may analyze receive waves measured over time and determine the position of an organism. In this case, the wireless power transmitter 100 may subtract a clutter map from a data map that represents the magnitude of receive waves on the time axis and determine the position of the organism based on the result of the subtract operation. The wireless power transmitter 100 may update the clutter map based on the data for the receive wave at each period and the clutter map for its prior period. The wireless power transmitter 100 may determine the position of the organism using the clutter map updated and the receive wave-associated data map, thereby allowing the organism to accurately be located. The processes of locating using a clutter map and a data map and updating a clutter map are described below in greater detail. The wireless power transmitter 100 may determine the position of an electronic device based on, at least, a communication signal received by a communication circuit. The wireless power transmitter 100 may include a communication circuit with, e.g., a plurality of antennas (e.g., an antenna array). The wireless power transmitter 100 may determine the position of the electronic device using at least one of the time of reception or the phase of the communication signal on each of the plurality of antennas. The wireless power transmitter 100 may determine the distance between the wireless power transmitter 100 and the electronic device using the strength of communication signals. For example, a communication signal may include information about its transmission strength, and the wireless power transmitter 100 may compare the transmission strength and reception strength of the communication signal, thereby able to determine the distance between the wireless power transmitter 100 and the electronic device. Alternatively, the wireless power transmitter 100 may determine the distance between the wireless power transmitter 100 and the electronic device using the time-of-flight (TOF) of communication signals. For example, a communication signal may include information about its transmission time, and the wireless power transmitter 100 may compare the transmission time and reception time of the communication signal, thereby able to determine the distance between the wireless power transmitter 100 and the electronic device.

According to an embodiment of the disclosure, the wireless power transmitter 100 may include a radar-type sensor. The wireless power transmitter 100 may produce transmit waves through the sensor and receive their corresponding receive waves. For example, an obstacle such as an electronic device or human body may be around the wireless power transmitter 100. The obstacle may mean an object capable of producing power using RF waves or another electronic device not designated as a target to be charged. Transmit waves produced from the sensor may be reflected on the electronic device or obstacle, resulting in reflected waves. The reflected waves may alter at least one of the amplitude or phase of transmit waves, resultantly making the receive waves differ, in at least one of amplitude or phase, from the transmit waves. The wireless power transmitter 100 may receive reflected waves through the sensor and determine at least one of the amplitude or phase of the reflected waves. The sensor of the wireless power transmitter 100 may include antennas for multiple receptions in which case each reflected wave may be received through a respective one of the antennas. According to an embodiment of the disclosure, receiving antennas may be utilized for transmitting waves or the wireless power transmitter 100 may include transmitting antennas and receiving antennas physically distinct from the transmitting antennas. Since the plurality of receiving antennas are placed physically in different positions, at least one of the amplitude, time of reception, or phase of receive waves may differ on the multiple receiving antennas. The wireless power transmitter 100 may detect the position of an ambient object by analyzing the pattern of reflected waves. For example, upon determining that the pattern of reflected waves has been varied, the wireless power transmitter 100 may determine that a new object approaches the wireless power transmitter 100. The wireless power transmitter 100 may determine the position of the electronic device based on at least one of the amplitude, phase, or time of reception of the receive wave received on at least one receiving antenna. The wireless power transmitter 100 may determine the position of the electronic device using various radar-based positioning schemes.

According to an embodiment of the disclosure, the wireless power transmitter 100 may include a sensor (e.g., a camera module) capable of obtaining images. The wireless power transmitter 100 may analyze obtained images and determine the position of at least one of the electronic device or object based on the result of analysis. For example, the wireless power transmitter 100 may obtain at least one image for at least one direction around. The wireless power transmitter 100 may consecutively obtain a plurality of frame images and detect a variation between the frame images. For example, the wireless power transmitter 100 may determine that an object which has not been detected from a first frame image is included in a second frame image, thereby determining that the subject corresponding to the object is positioned near the wireless power transmitter 100 at the time corresponding to the second frame image. The wireless power transmitter 100 may determine the position of the subject near the wireless power transmitter 100 based on at least one of the position or size of the object in the image. For example, the wireless power transmitter 100 may determine the position of the subject based on at least one of the position or size of the object in the image and at least one of the position of the camera having captured the image or the direction of the capturing. The wireless power transmitter 100 may apply various recognition algorithms to the image, enabling a determination as to whether the object newly detected is a rechargeable electronic device or human body. The wireless power transmitter 100 may determine the position of the electronic device using various types of sensors or receive information about the position of the electronic device from another locator.

In operation 203, the wireless power transmitter 100 may produce RF waves based on the position determined. The wireless power transmitter 100 may control at least one of the phase or amplitude of each electrical signal input to a respective one of the patch antennas so that sub RF waves constructively interfere with one another in the position determined. The wireless power transmitter 100 may control at least one of the phase or amplitude of each electrical signal input to a respective one of the patch antennas by controlling at least one of a phase shifter or amplifier connected to each of the patch antennas. According to an embodiment of the disclosure, the wireless power transmitter 100 may control at least one of the phase or amplitude of each electrical signal input to a respective one of the patch antennas so that RF waves may constructively interfere with one another in the position of the electronic device while RF waves not less than a designated magnitude are prevented from being applied in the position of the organism.

According to an embodiment of the disclosure, the wireless power transmitter 100 may control at least one of the phase or amplitude of each electrical signal input to a respective one of the patch antennas using information about an association between at least one of the phase or amplitude of electrical signals and spatial coordinates previously retained. The wireless power transmitter 100 may quickly identify transmission conditions for RF waves by using association information about at least one of the amplitude or the degree of phase control for the electrical signal input to each of the plurality of patch antennas corresponding to the position of the electronic device 150 identified via various types of sensors. The wireless power transmitter 100 may identify, by computation or based on pre-stored information, the magnitude of RF waves applied to the position of the organism in the case where the RF waves are produced based on the transmission conditions identified. Where the magnitude of RF waves applied to the position of the organism is not less than a designated value, the wireless power transmitter 100 may produce RF waves using a bypass route.

Figure 3:
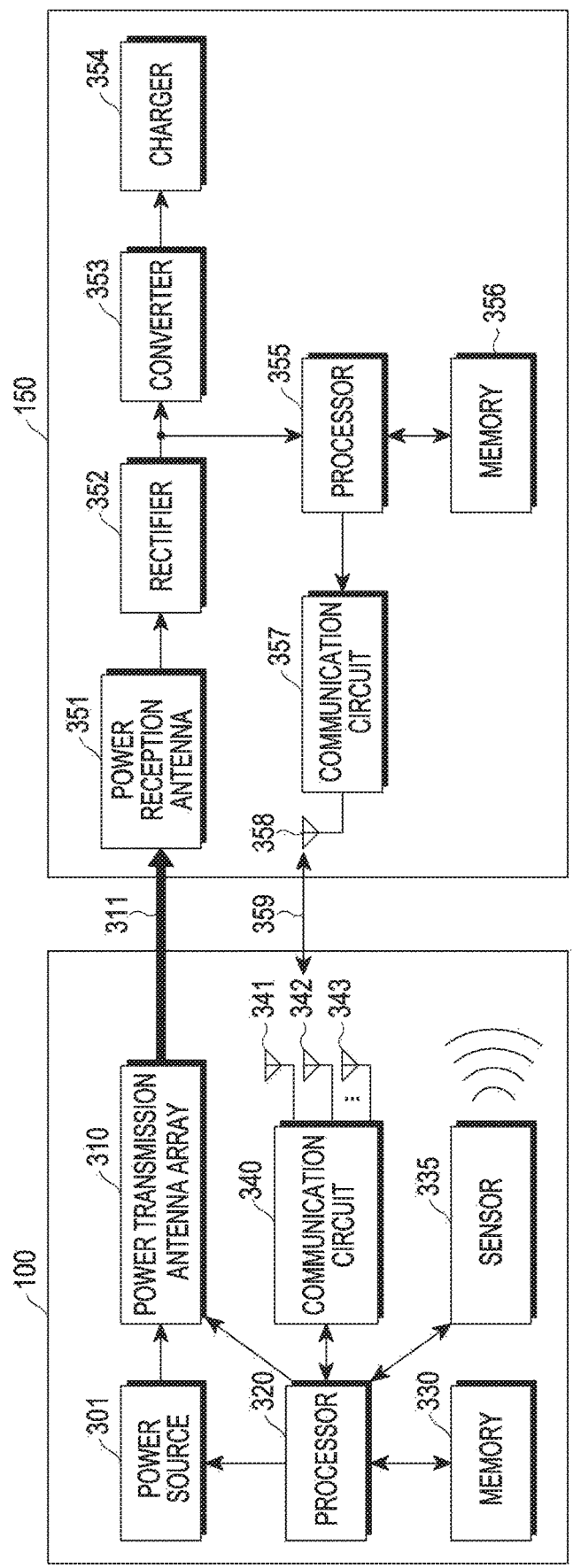
FIG. 3 is a block diagram illustrating a wireless power transmitter according to an embodiment of the disclosure.

FIG. 3 is a block diagram illustrating a wireless power transmitter according to an embodiment of the disclosure.

According to an embodiment of the disclosure, a wireless power transmitter 100 may include a power source 301, an antenna array 310 for power transmission, a processor 320, a memory 330, a sensor 335, a communication circuit 340, and antennas 341 to 343 for communication. An electronic device 150 is not limited as long as it is a device capable of wirelessly receiving power and may include an antenna 351 for power reception, a rectifier 352, a converter 353, a charger 354, a processor 355, a memory 356, a communication circuit 357, and an antenna 358 for communication.

The power source 301 may provide power for transmission to the antenna array 310 for power transmission. The power source 301 may provide, e.g., direct current (DC) power, in which case the wireless power transmitter 100 may further include an inverter (not shown) that converts DC power into alternating current (AC) power and delivers the AC power to the antenna array 310 for power transmission. Meanwhile, according to an embodiment of the disclosure, the power source 301 may provide AC power to the antenna array 310 for power transmission. According to an embodiment of the disclosure, the sensor 335 may include an antenna for transmitting waves or an antenna for receiving reflected waves. A device inclusive of an antenna for transmitting waves and an antenna for receiving reflected waves may be referred to as a transceiver. According to an embodiment of the disclosure, the sensor 335 may include a plurality of transceivers. For example, the processor 320 may use one transceiver to determine the distance between the transceiver and an organism. The processor 320 may use two transceivers to determine the distance between each transceiver and an organism, thereby determining the position in two dimension (2D) of the organism based on the distances determined.

The power transmission antenna array 310 and the sensor 335 may share the power source 301 in which case the power source 301 may produce power with multiple frequencies. Alternatively, the wireless power transmitter 100 may include a power source (not shown) for powering the sensor 335.

The antenna array 310 for power transmission may include a plurality of patch antennas. For example, a plurality of patch antennas as shown in FIG. 1 may be included in the antenna array 310 for power transmission. The number or array form of the patch antennas is not limited. The antenna array 310 for power transmission may form a RF wave using the power received from the power source 301. The antenna array 310 for power transmission may form a RF wave in a particular direction under the control of the processor 320. Here, forming a RF wave in a particular direction may mean controlling at least one of the amplitude and phase of sub-RF waves so that the sub-RF waves constructively interfere with one another at a point in the particular direction. For example, the processor 320 may control at least one of a phase shifter or amplifier connected to the power transmission antenna array 310. Meanwhile, the antenna array 310 for power transmission is one for transmitting power and may be termed an antenna for power transmission.

The processor 320 may determine the position of the electronic device 150 and perform control to produce RF waves based on the position determined. In other words, the processor 320 may control the patch antennas of the power transmission antenna array 310 that produces sub-RF waves so that the sub-RF waves constructively interfere with one another in the position determined. For example, the processor 320 may control at least one of the amplitude and phase of each sub-RF wave produced from a respective one of the patch antennas by controlling the patch antennas or a control means (e.g., at least one of an amplifier or a phase shifter) connected with the patch antennas. The processor 320 may control the patch antennas or a control means (e.g., at least one of a phase shifter or amplifier) connected with the patch antennas to prevent RF waves of a designated magnitude or more from being produced in the identified position of the organism. For example, the processor 320 may determine the position of the organism using a plurality of transceivers and may produce RF waves such that beamforming is possible in the position of the electronic device 150 without having a designated magnitude or more in the corresponding position.

According to an embodiment of the disclosure, the processor 320 may determine the position of the electronic device 150 based on, at least, data obtained by the sensor 335. The sensor 335 may include at least one antenna which may be of, e.g., a radar type. The processor 320 may control at least some of the at least one antenna to produce transmit waves. For example, at least one antenna may produce transmit waves at the same or different times. Only one of the at least one antenna may produce transmit waves. The transmit waves may be reflected on the electronic device 150 or organism. Hence, the reflected waves may travel in a different direction from the transmit waves. At least one of the amplitude or phase of the reflected waves may differ from at least one of the amplitude or phase of the transmit waves. The antenna may convert the reflected waves into electrical signals and output them to the sensor. The sensor may sense information about at least one of the phase, amplitude, or time of reception of each reflected wave according to the electrical signal output from each antenna. The processor 320 may determine the position of at least one of the electronic device 150 or organism based on at least one of the phase, amplitude, or time-of-reception information about each reflected wave. The processor 320 may determine the position of the organism based on the result of subtraction of a clutter map from a data map corresponding to the reflected wave, i.e., received waves. The processor 320 may update the clutter map at each period, e.g., using the clutter map of the existing period and the data map of the current period, which is described below in greater detail.

According to an embodiment of the disclosure, the wireless power transmitter 100 may receive a communication signal 359 from the electronic device 150 through the antennas 341, 342, and 343. The processor 320 may determine the position of the electronic device 150 based on the time of reception of the communication signal 359 on each antenna 341, 342, and 343. The processor 320 may determine the position of the electronic device 150 using information obtained through the communication circuit 340 along with data from the sensor 335. For example, at least three communication antennas 341 to 343 may be arranged, e.g., for the purpose of determining a three-dimensional (3D) direction, e.g., values θ and φ in the spherical coordinate system. Specifically, the communication circuit 340 of the electronic device 150 may send out the communication signal 359. According to an embodiment of the disclosure, the communication signal 359 may contain at least one of identification information about the electronic device 150, information required for wireless charging, or at least one piece of sensing information of the electronic device 150. Thus, the wireless power transmitter 100 may determine the direction of the electronic device 150 using the communication signal for wireless charging, without adding a separate hardware structure. Meanwhile, times of reception of the communication signal 359 by the communication antennas 341 to 343 may differ. The processor 320 of the wireless power transmitter 100 may determine a direction of the electronic device 150 relative to the wireless power transmitter 100 using the times (e.g., t1, t2, and t3) of reception of the communication signal by the communication antennas 341, 342, and 343. For example, the processor 320 may determine a direction of the electronic device 150 relative to the wireless power transmitter 100 using information about time differences t1-t2, t2-t3, and t3-t1. Or, the processor 320 may determine a relative direction of the electronic device 150 using a lookup table between the direction of the electronic device and the difference in reception time per communication antenna, which is stored in, e.g., the memory 330. The wireless power transmitter 100 (or the processor 320) may determine a relative direction of the electronic device 150 in various manners. For example, the wireless power transmitter 300 (or the processor 320) may determine a relative direction of the electronic device 150 in various ways, such as time difference of arrival (TDOA) or frequency difference of arrival (FDOA), and the program or algorithm determining the direction of received signal is not limited in type. The wireless power transmitter 100 may determine a relative direction of the electronic device 150 based on the phase of the communication signal received.

According to an embodiment of the disclosure, the processor 320 may determine whether the type of object determined using the sensor 335 is an organism or electronic device depending on whether the communication signal 359 is received. Upon determining that the position where the communication signal 359 is formed corresponds to the position determined by the sensor 335, the processor 320 may determine that the object sensed by the sensor 335 is the electronic device 150. Where the position where the communication signal 359 is formed fails to correspond to the position determined by the sensor 335 or the communication signal 359 is not received, the processor 320 may determine that the object sensed by the sensor 335 is not the electronic device 150. Or, the processor 320 may determine whether the object sensed is an organism or electronic device based on, at least, the pattern of waves reflected on the object.

The processor 320 may control the power transmission antenna array 310 based on the position of the electronic device 150 and the position of the organism. This enables the wireless power transmitter 100 to produce RF waves towards the electronic device 150 without applying a designated magnitude or more of RF waves to the organism. The processor 320 may identify the electronic device 150 using information contained in the communication signal 359. The communication signal 359 may include the unique identifier and unique address of the electronic device. The communication circuit 340 may process the communication signal 359 and provide information to the processor 320. The communication circuit 340 and the communication antennas 341, 342, and 343 may be manufactured based on various communication schemes, such as wireless-fidelity (Wi-Fi), Bluetooth, zig-bee, and Bluetooth low energy (BLE), which are not limited to a particular type. Meanwhile, the communication signal 359 may include rated power information about the electronic device 150. The processor 320 may determine whether to charge the electronic device 150 based on at least one of the unique identifier, unique address, and rated power information of the electronic device 150. The processor 320 may include one or more of a central processing unit (CPU), an AP, or a communication processor (CP), and the processor 320 may be implemented as a micro-controller unit or a mini computer.

Further, the communication signal 359 may be used in the process for the wireless power transmitter 100 to identify the electronic device 150, the process of permitting power transmission to the electronic device 150, the process of sending a request for receive power-related information to the electronic device 150, and the process of receiving the receive power-related information from the electronic device 150. In other words, the communication signal 359 may be used in a process for a subscription, command, or request between the wireless power transmitter 100 and the electronic device 150. The communication signal 359 may also contain information sensed by the electronic device 150 (e.g., motion sensing information, such as acceleration sensing information or rotation sensing information or information associated with the magnitude of power, such as voltage or current).

Meanwhile, the processor 320 may control the power transmission antenna array 310 to produce a RF wave 311 towards the determined position of the electronic device 150. The processor 320 may perform control to produce the RF wave 311 towards the electronic device 150 by controlling at least one of a phase shifter or amplifier which is included in, or connected outside, the power transmission antenna array 310.

The antenna 351 for power reception is not limited as long as it is an antenna capable of receiving RF waves. Further, the antenna 351 for power reception may be implemented in the form of an array of a plurality of antennas. The AC power received by the antenna 351 for power reception may be rectified into DC power by the rectifier 352. The converter 353 may convert the DC power into a voltage required and provide the voltage to the charger 354. The charger 354 may charge a battery (not shown). Although not shown, the converter 353 may provide the converted power to a power management integrated circuit (PMIC) (not shown), and the PMIC (not shown) may provide power to various hardware structures of the electronic device 150.

Meanwhile, the processor 355 may monitor the voltage at the output end of the rectifier 352. For example, the electronic device 150 may further include a voltage meter connected to the output end of the rectifier 352. The processor 355 may receive a voltage value from the voltage meter and monitor the voltage at the output end of the rectifier 352. The processor 355 may provide information containing the voltage value at the output end of the rectifier 352 to the communication circuit 357. Although the charger, converter, and PMIC may be implemented in different hardware units, at least two of them may be integrated into a single hardware unit. Meanwhile, the voltage meter may be implemented in various types, such as an electrodynamic instrument voltage meter, an electrostatic voltage meter, or a digital voltage meter, without limited in type thereto. The communication circuit 357 may send out the communication signal including receive power-related information using the communication antenna 358. The receive power-related information may be information associated with the magnitude of power received, such as, e.g., the voltage at the output end of the rectifier 352, and may contain a current at the output end of the rectifier 352. In this case, it will readily be appreciated by one of ordinary skill in the art that the electronic device 150 may further include a current meter capable of measuring current at the output end of the rectifier 352. The current meter may be implemented in various types, such as a DC current meter, AC current meter, or digital current meter, without limited in type thereto. Further, the receive power-related information may be measured at any point of the electronic device 150, but not only at the output or input end of the rectifier 352. Or, the processor 355 may carry various pieces of sensing information of the electronic device 150 in the communication signal 359. Further, as set forth above, the processor 355 may send out a communication signal 359 containing identification information about the electronic device 150. The memory 356 may store a program or algorithm capable of controlling various hardware units of the electronic device 150.

Figure 4:
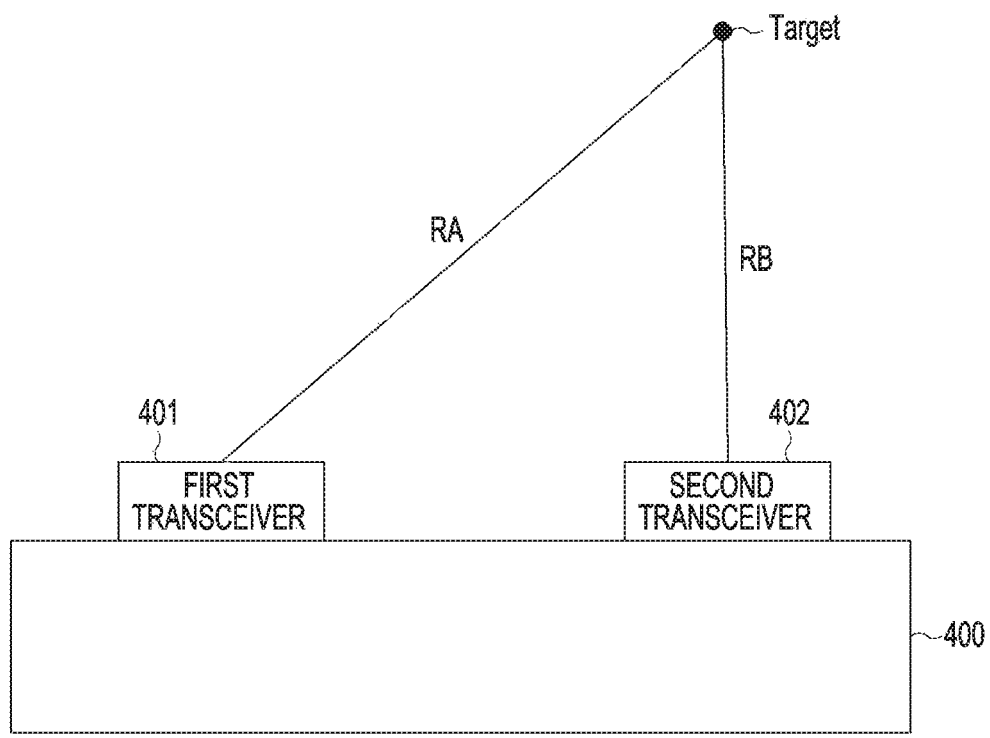
FIG. 4 is a view illustrating a locator according to an embodiment of the present disclosure.

FIG. 4 is a view illustrating a locator according to an embodiment of the disclosure.

According to the embodiment of FIG. 4, the locator 400 may be included in the wireless power transmitter 100, or the locator 400 may be implemented standalone. The locator 400 may include a first transceiver 401 and a second transceiver 402. The first transceiver 401 and the second transceiver 402 each may include an antenna for transmitting waves and an antenna for receiving reflected waves, i.e., receive waves, corresponding to the transmit waves. Accordingly, the first transceiver 401 and the second transceiver 402 may also be referred to as sensors. The locator 400 may determine the distance RA from the first transceiver 401 to a target based on data about the receive wave obtained through the first transceiver 401. The locator 400 may determine the distance RB from the second transceiver 402 to the target based on data about the receive wave obtained through the second transceiver 402. The locator 400 may determine the position of the target with respect to the locator 400 based on the distance RA from the first transceiver 401 and the distance RB from the second transceiver 402. For example, the locator 400 may determine the position of the target using triangulation. The locator 400 may be placed near a wall, allowing the target to be located using two transceivers.

The wireless power transmitter 100 may determine conditions for producing RF waves based on, e.g., the position of the target received from the locator 400. According to an embodiment of the disclosure, although the first transceiver 401 and the second transceiver 402 may be implemented as impulse radio ultra-wideband (IR-UWB) radars, it will readily be appreciated by one of ordinary skill in the art that they are not limited as so implemented. IR-UWB radars may be adequate for detecting passive targets that transmit no signals to other anchor nodes. IR-UWB radars produce electromagnetic waves of a relatively small magnitude, less likely to affect the human body and hence appropriate for detecting organisms.

Figure 5:
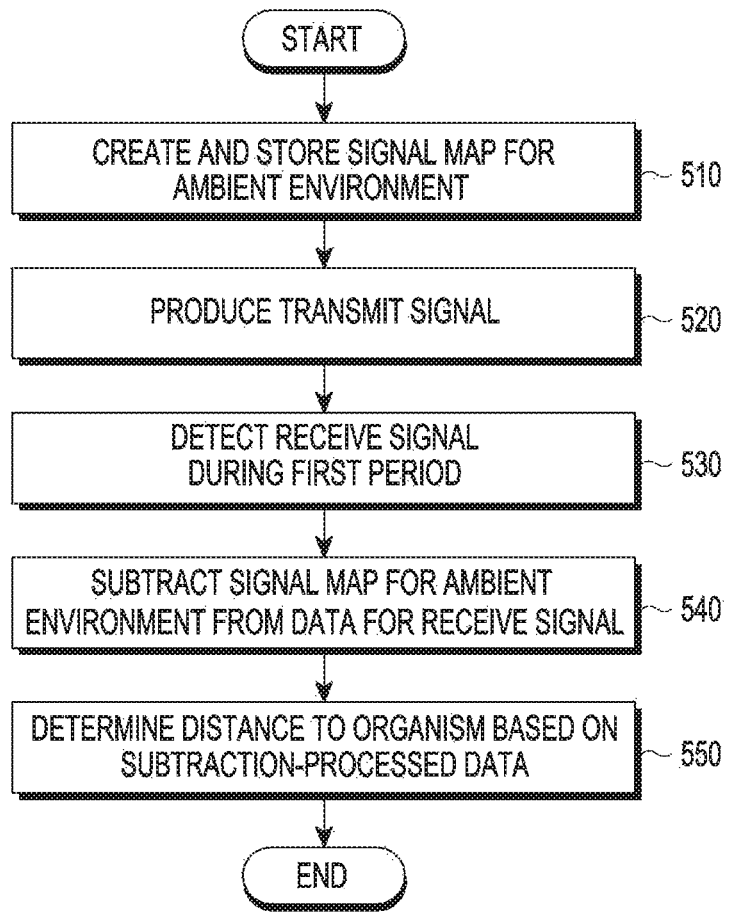
FIG. 5 is a flowchart illustrating a method for operating a locator using a clutter map according to an embodiment of the disclosure.

FIG. 5 is a flowchart illustrating a method for operating a locator using a clutter map according to an embodiment of the disclosure.

In operation 510, according to an embodiment of the disclosure, the locator 400 may generate and store a signal map for the ambient environment—the signal map for the ambient environment may be named a clutter map. Electromagnetic waves transmitted may be reflected on an object near the locator 400. Thus, the clutter map may be data representing reflection characteristics of at least one object located around the locator 400. As set forth supra, the locator 400 may be included in the wireless power transmitter 100 in which case the operation of the locator 400 may be construed as the operation of the wireless power transmitter 100. "Wireless power transmitter 100 (or locator 400) performs a particular operation" may mean that a processor 320 included in the wireless power transmitter 100 (or a processor included in the locator 400) performs a particular operation. "Wireless power transmitter 100 (or locator 400) performs a particular operation" may mean that a processor 320 included in the wireless power transmitter 100 (or a processor included in the locator 400) controls other hardware to perform a particular operation. "Wireless power transmitter 100 (or locator 400) performs a particular operation" may mean that at least one hardware unit or structure included in the wireless power transmitter 100 (or the locator 400) performs a particular operation as per execution of an instruction corresponding to the particular operation stored in a memory 330 included in the wireless power transmitter 100 (or a memory included in the locator 400). According to an embodiment of the disclosure, the locator 400 may transmit signals in an environment where no target is located, receive signals corresponding thereto, and generate a clutter map based on the receive signals received. The clutter map may have one axis, which may be a time axis, and another axis, which may be an axis representing the strength of signals. The locator 400 may perform sampling on the data about the strength of receive signal, obtaining N samples, where N is a positive integer equal to or larger than 1. The locator 400 may generate a first clutter map based on the N samples.

In operation 520, the locator 400 may produce a transmit signal to locate an organism. In operation 530, the locator 400 may detect a receive signal during a first period. The locator 400 may perform sampling on the data about the strength of the receive signal, obtaining N samples. The time interval between two adjacent ones of the samples may be, e.g., 13 ps, but it will readily be appreciated by one of ordinary skill in the art that the time interval is not limited thereto. The time interval of 13 ps may correspond to a difference of 4 mm in light of distance, meaning that 256 samples are needed to scan a 1 m range. A kth signal vector ($r_k$) received by the locator 400 may be depicted in Equation 1 below:

$$r_k=[r_k(1),r_k(2),\ldots,r_k(N)]^T \qquad \text{Equation 1}$$

The kth signal vector ($r_k$) received may be represented in the form of, e.g., a transpose matrix, where the in-matrix element $r_k(i)$ may be the ith sample of the kth receive signal received, and this may be signal strength data. As set forth above, the locator 400 may convert the receive signal into N samples by sampling, thereby creating the signal vector ($r_k$) with N elements. The locator 400 may create a matrix R, as shown in Equation 2, and including the Kth signal vector for the Kth receive signal received from the first signal vector for the first receive signal received.

$$R=[r_1,r_2,\ldots,r_K]^T \qquad \text{Equation 2}$$

The signal vector ($r_k$) in the matrix R of Equation 2 may correspond to a relatively slow time domain, and each element $r_k(i)$ included in the signal vector ($r_k$) may correspond to a relatively fast time domain. The signal vector ($r_k$) and matrix R may have low-frequency noise, white noise, external interference signals, and clutter signals. Clutter signals may mean signals reflected on other objects than a desired target, i.e., an organism, causing them to act as additional noise upon detecting the target.

As described above, the locator 400$n$ according to an example may create a signal vector ($r_k$) using 256 samples, with the likelihood of posing a significant variation between the 256th sample and the 257th sample, i.e., the sample of the next frame. Such discontinuity may play as additional noise, presumably degrading signal-to-noise ratio (SNR). To avoid the influences, the locator 400 may carry out a frame stitching process. The frame stitching process may be represented as shown in Equation 3:

$$[\bar{r}_k(1+(m-1)\cdot 256),\ldots,\bar{r}_k(256+(m-1)\cdot 256)]^T=[r_k(1+(m-1)\cdot 256),\ldots,r_k(256+(m-1)\cdot 256)]^T+r_k(1+(m-2)\cdot 256)-r_k(1+(m-1)\cdot 256) \text{ for } m=2,\ldots,M,k=1,\ldots,K \qquad \text{Equation 3}$$

In Equation 3 above, $\bar{r}_k$ may mean the receive signals frame-stitched, and M may be N/256.

Figure 8A:
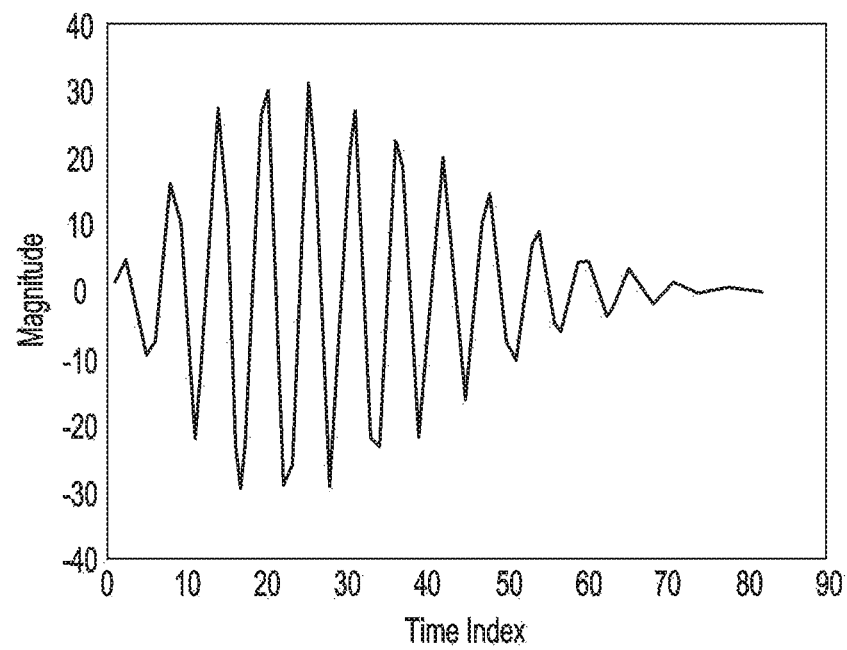
FIG. 8A is a graph illustrating signal magnitudes relative to time indexes of pulse signals transmitted.
Figure 8B:
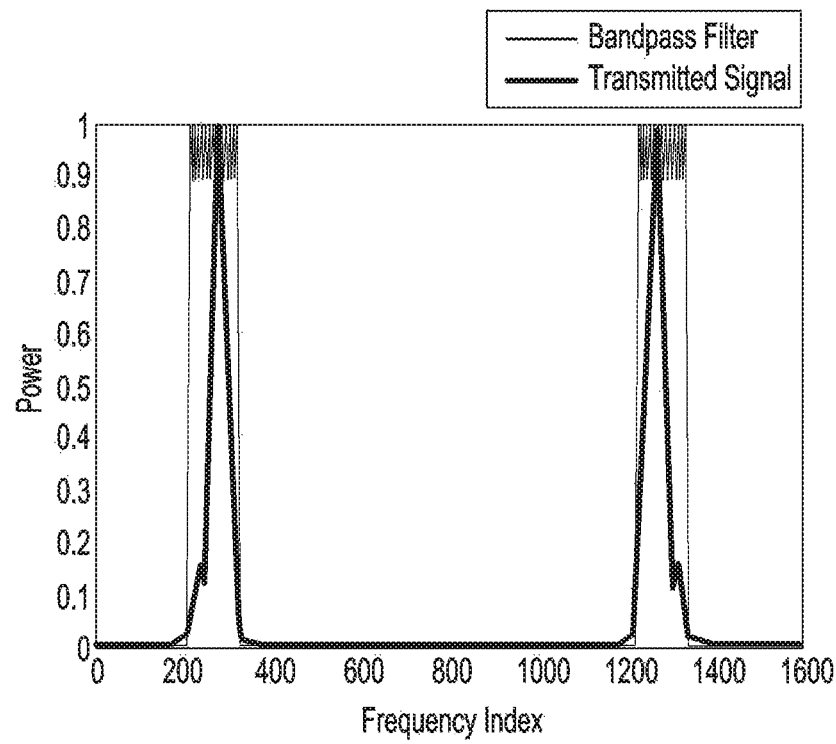
FIG. 8B is a graph illustrating power spectra relative to frequency indexes of a bandpass filter.

According to an embodiment of the disclosure, the locator 400 may perform an additional process, e.g., low-frequency noise removal, on the frame stitched-signals. For example, low-frequency noise may be created by the transceiver hardware and external interference signals. The locator 400 may perform filtering in a relatively fast time domain using, e.g., a bandpass filter. To set up an adequate pass band, the locator 400 may check the frequency band of the pulse signal transmitted. The signal magnitude of the pulse signal transmitted, relative to time index, may be shown in FIG. 8A. The pass band of the bandpass filter may be set based on the power spectrum of signal obtained, and the power spectrum of the bandpass filter, relative to frequency index, may be shown in FIG. 8B. The signal ($\hat{r}_k$) filtered by the locator 400 may be represented as in Equation 4:

$$\hat{r}_k=\bar{r}_k \otimes b \qquad \text{Equation 4}$$

In Equation 4 above, b may mean the coefficient filter of the bandpass filter, and the signal ($\hat{r}_k$) that has undergone filtering, may be obtained by the convolution ($\otimes$) of the signal ($\bar{r}_k$) frame-stitched and the coefficient vector (b of the bandpass filter.

According to an embodiment of the disclosure, the locator may carry out a cross-correlation process on the filtered signal ($\hat{r}_k$). The cross-correlation process may be represented as in Equation 5:

$$\hat{r}_k = [\hat{r}_k(1), \hat{r}_k(2), \cdots, \hat{r}_k(N)]^T \qquad \text{Equation 5}$$

$$\text{where } \hat{r}_k(l) = \sum_{n=1}^{N} \hat{r}_k(n)s(n-l) \text{ for } l = 1, \cdots, N$$

In Equation 5, s(n−1) may be the n−1th component of the pulse signal transmitted, and the locator 400 may cross-correlate the receive signals and the transmitted pulse signals as per Equation 5. As the receive signals are cross-correlated with the transmitted pulse signals, the magnitude of the reflected signals included in the received signals may increase while noise or interference signals may reduce in magnitude. The above-described processes may let the target signal and clutter signal dominant in the received signals, increasing SNR.

In operation 540, the locator 400 may subtract a signal map for the ambient environment, i.e., clutter map, from data about the received signals. In operation 550, the locator 400 may determine the distance to the organism based on the data resulting from the subtraction. The locator 400 may predict the clutter signal, and the clutter signal predicted may be named a clutter map. The locator 400 may identify, as shown in Equation 6, the kth clutter map ($c_k$) to process the kth signal received.

$$c_k=\lambda\cdot c_{k-1}+(1-\lambda)\cdot \hat{r}_k \qquad \text{Equation 6}$$

In Equation 6, $c_{k-1}$ is the k−1th clutter map, and $\lambda$ may be any coefficient. The clutter map ($c_k$) may be represented as $[c(1),c(2),\ldots,c(N)]^T$ in vector and may have N elements.

According to an embodiment of the disclosure, the locator 400 may update the kth clutter map using the kth signal received and the k−1th clutter map as shown in Equation 7 below:

$$c_k(n) = \begin{cases} \hat{r}_k(n), & |\hat{r}_k(n) - c_{k-1}(n)| < 0.1 \cdot |c_{k-1}(n)| \\ c_{k-1}(n), & |\hat{r}_k(n) - c_{k-1}(n)| > 1 \cdot |c_{k-1}(n)| \\ \lambda \cdot c_{k-1}(n) + (1-\lambda)\hat{r}_k(n), & \text{otherwise.} \end{cases} \qquad \text{Equation 7}$$

The locator 400 may compare a difference between the data of the kth receive signal and the data of the k−1th clutter map with the value of the k−1th clutter map and may determine data to be updated depending on the result of comparison. For example, where the difference between the data of the kth receive signal and the data of the k−1th clutter map is less than 0.1 times the data of the k−1th clutter map, the locator 400 may set the data of the kth signal received as the data of the kth clutter map. For example, where the difference between the data of the kth receive signal and the data of the k−1th clutter map exceeds the data of the k−1th clutter map, the locator 400 may set the data of the k−1th clutter map as the data of the kth clutter map. By way of example, where the difference between the data of the kth signal received and the data of the k−1th clutter map is not less than 0.1 times the k−1th clutter map nor does it exceed the data of the k−1th clutter map, the locator 400 may set the data of the k−1th clutter map as per Equation 6. Specifically, the locator 400 may set the data of the k−1th clutter map based on the sum of $\lambda$ times the data of the k−1th clutter map and k=1 times the signal ($\hat{r}_k$) that has undergone the cross-correlation process. The locator 400 may perform, as shown in Equation 8 below, subtraction of the signal ($\hat{r}_k$) that has undergone the cross-correlation process and the kth clutter map updated.

$$r^*_k = \hat{r}_k - c_k, \text{ for } k=1,2,\ldots,K. \qquad \text{Equation 8}$$

The locator 400 may determine the position of the target based on target data ($r^*_k$) obtained as a result of the subtraction. The locator 400 may determine that the target is positioned where the target data ($r^*_k$) is larger than a designated value. For example, upon determining that the target data is larger than the designated value in the range where k=3, 4, 5, 6, and 7, the locator 400 may determine that the target is positioned at the distance points determined based on the time information about samples 3, 4, 5, 6, and 7. In other words, the locator 400 may determine the position of the target based on the result of peak-detecting the target data. The locator 400 may multiply the target data ($r^*_k$) by a distance correction value, followed by peak detecting, thereby locating the target. This may be a procedure for increasing the value of data corresponding to a relatively long distance.

Figure 6:
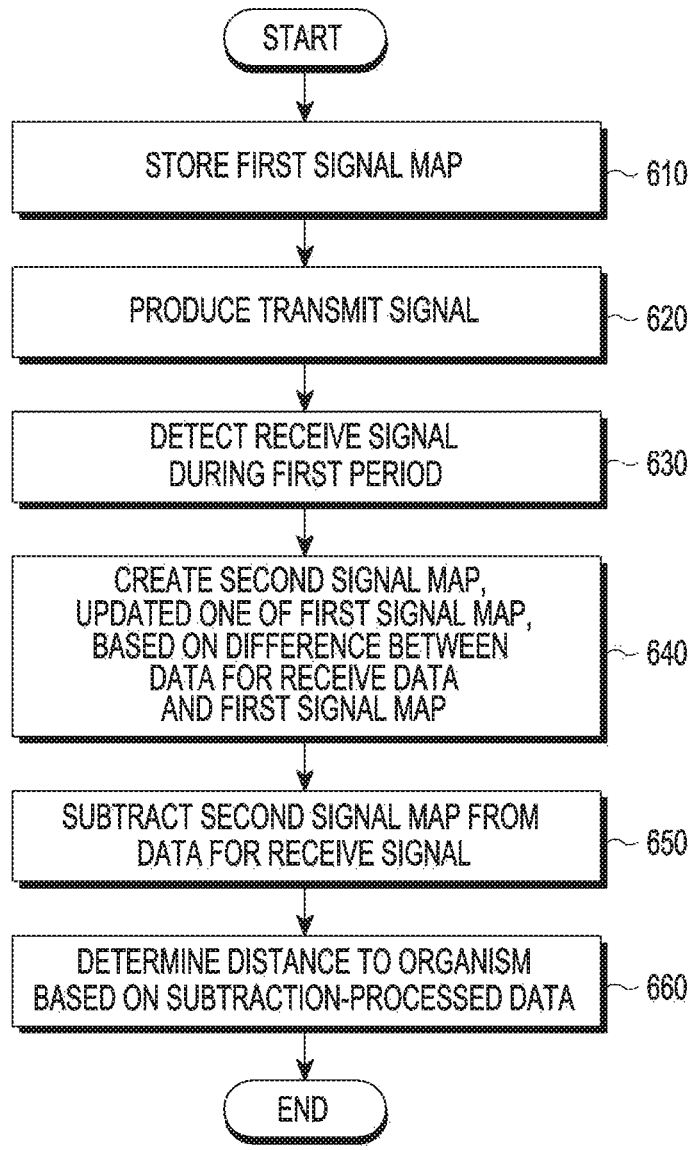
FIG. 6 is a flowchart illustrating a method for operating a locator according to an embodiment of the disclosure.

FIG. 6 is a flowchart illustrating a method for operating a locator according to an embodiment of the disclosure.

According to an embodiment of the disclosure, the locator 400 may store a first signal map in operation 610. For example, the first signal map may be a map created by the locator 400 in a target-free environment and may be utilized as a reference. Specifically, the locator 400 may transmit signals in the targetless environment and receive signals corresponding to the transmitted signals. The locator 400 may perform at least one of, e.g., frame stitching, band pass filtering, or cross-correlation, on the receive signals and may obtain the first signal map according to the result and store it.

In operation 620, the locator 400 may generate transmit signals. In operation 630, the locator 400 may detect a receive signal during a first period. In operation 640, the locator 400 may create a second signal map, which is an updated one for the first signal map, based on a difference between data for the receive signal and the first signal map. For example, the locator 400 may perform at least one of, e.g., frame stitching, band pass filtering, or cross-correlation, on the receive signal during the first period. The locator 400 may create a second signal map, which is an updated one for the first signal map, based on a difference between the processed receive signal and the first signal map. For example, the locator 400 may, as shown in Equation 7, may compare the difference between the processed signal (e.g., $r_k(n)$) and the first signal map (e.g., $c_{k-1}(n)$) with the first signal map (e.g., $c_{k-1}(n)$) and may determine the value of the second signal map according to the result of comparison. In operation 650, the locator 400 may subtract the second signal map from data for the receive signal. In operation 660, the locator 400 may determine the distance, i.e., position, to the organism based on the resultant data of the subtraction.

Figure 7:
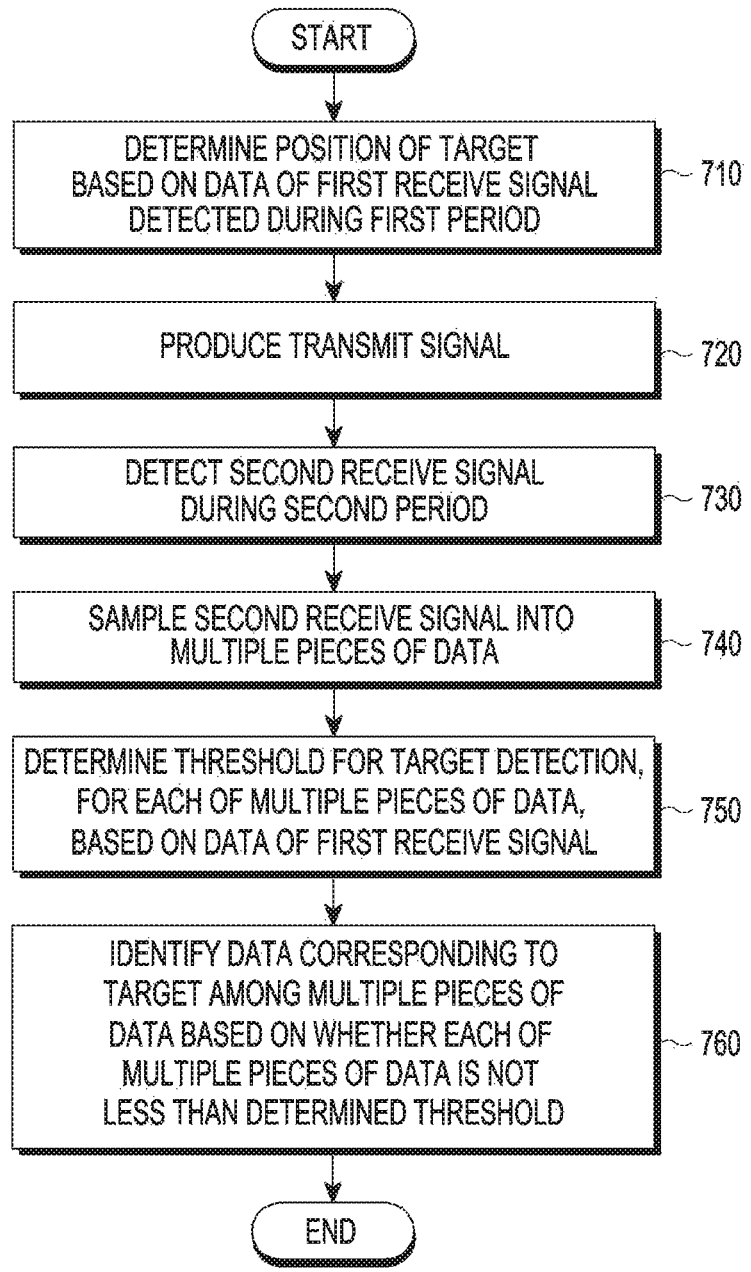
FIG. 7 is a flowchart illustrating a method for operating a locator according to an embodiment of the disclosure.

FIG. 7 is a flowchart illustrating a method for operating a locator according to an embodiment of the disclosure.

According to an embodiment of the disclosure, the locator 400 may determine the position of a target based on data of a first receive signal detected during a first period in operation 710. The locator 400 may determine the position of the target based on a peak detecting scheme on the first receive signal. The locator 400 may determine the position of the target based on the data of the first receive signal detected during the first period as per the scheme described above in connection with, e.g., FIG. 5 or 6, or determine the target position in other schemes. The position of the peak, although nearly remaining the same, may be drastically varied due to a false alarm. A false alarm may cause an error in the position of the target. Such false alarm may be an instantaneous peak, and not continuous though. Such errors may be mitigated by compensating for the current-period peak position with at least one prior-period peak position. In particular, since the time interval between two receive signals is pretty short, the difference between the current-period peak position and the prior-period peak position might not be significant. As obtained by a result of performing peak detection by the locator 400, the peak set ($\delta_{k-1}$) for the k−1th receive signal may be shown as in Equation 9:

$$\delta_{k-1} = \{p_{(k-1)j} | 0 \leq j \leq P\} \qquad \text{Equation 9}$$

In Equation 9, $p_{(k-1)j}$ refers to the position of the peak, where k−1 denotes the signal is the k−1th one received, and j may be a number larger than 0 and smaller than P. P may be the total number of peaks detected from the k−1th receive signal.

In operation 720, the locator 400 may generate transmit signals. In operation 730, the locator 400 may detect a second receive signal during a second period. The second receive signal received during the second period is referred herein as to a kth signal received. In operation 740, the locator 400 may sample the second receive signal into a plurality of pieces of data. The locator 400 may obtain target data ($r^*_k$) by at least one of the processes represented as in Equations 1 to 9 above, for example. In operation 750, the locator 400 may determine a threshold for target detecting, for each of the plurality of pieces of data based on the data of the first receive signal. For example, the locator 400 may obtain a weight vector of Equation 10 based on the peaks of the prior period.

$$g_k = \left[ \left| \frac{1}{1 - p_{(k-1)j}} \right|, \left| \frac{1}{2 - p_{(k-1)j}} \right|, \ldots, \left| \frac{1}{N - p_{(k-1)j}} \right| \right]^T \qquad \text{Equation 10}$$

The locator 400 may perform computation, as shown in Equation 11, on the weight vector and the target data ($r^*_k$) which has been received kth and processed.

$$z_k = r^*_k * g_k \qquad \text{Equation 11}$$

Equation 11 may mean a component multiplier. Based on the weight factor-applied target data ($z_k$), the locator 400 may produce the threshold ($t_k$) for peak detection. For example, the locator 400 may create the threshold ($t_k$) based on an ordered statistics-constant false alarm rate (OS-CFAR) scheme. In operation 760, the locator 400 may identify the data corresponding to the target among the plurality of pieces of data based on whether each of the plurality of pieces of data in the weight factor-applied target data ($z_k$) is the determined threshold ($t_k$) or more. The locator 400 may determine the index (n*) where the target data ($z_k$) exceeds the threshold ($t_k$). When there is no index (n*) where the target data ($z_k$) exceeds the threshold ($t_k$), the locator 400 may remove $p_{(k-1)j}$ from the peak set ($\delta_k$). When there is the index (n*) where the target data ($z_k$) exceeds the threshold ($t_k$), the locator may replace $p_{kj}$ with $p_{(k-1)j}$ in the peak set ($\delta_k$). Further, the locator 400 may add peaks ($p_{k(P+1)}$, $p_{k(P+2)}$, etc.) newly identified to the peak set ($\delta_k$).

As set forth above, according to an embodiment of the disclosure, the locator 400 may apply a relatively large weight to data corresponding to where a peak is detected during an existing period, enabling far more precise peak detection.

Figure 9A:
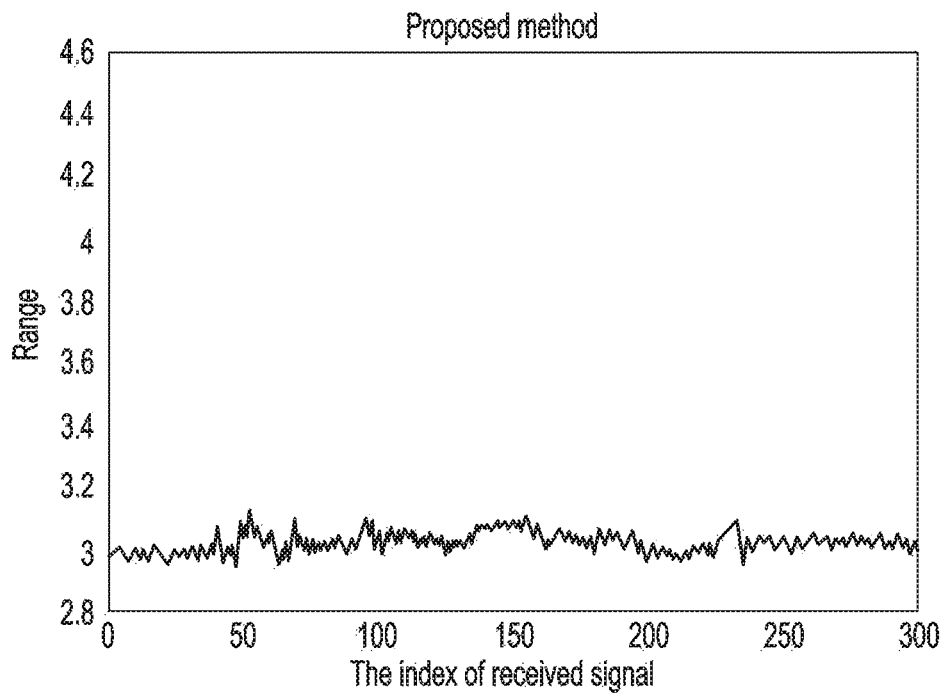
FIG. 9A is a view illustrating data as per multiple received signal indexes obtained by a locator according to an embodiment of the disclosure.
Figure 9B:
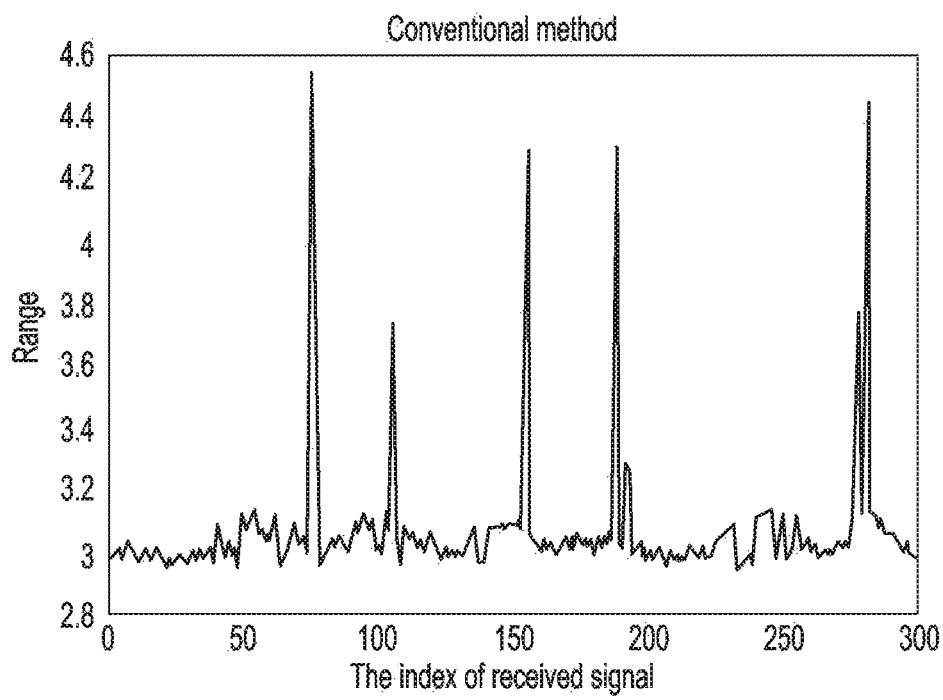
FIG. 9B is a view illustrating data as per multiple received signal indexes obtained by a locator according to an embodiment of the present disclosure.

FIG. 9A is a view illustrating data as per multiple received signal indexes obtained by a locator according to an embodiment of the disclosure. FIG. 9B is a view illustrating data as per multiple received signal indexes obtained by a locator according to an embodiment of the present disclosure. It can be verified from FIG. 9A that the distance is stably measured as being 3 m or more or less, compared with an example shown in FIG. 9B where the determined distance encounters an error due to a false alarm.

Figure 10A:
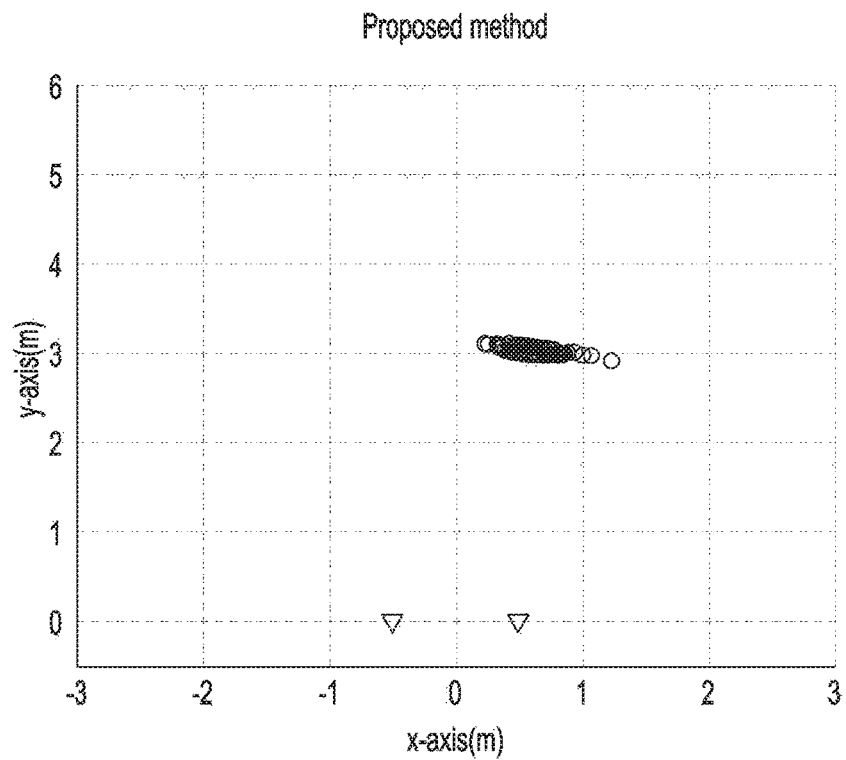
FIG. 10A is a view illustrating data about a location of a target obtained by a locator according to an embodiment of the disclosure.
Figure 10B:
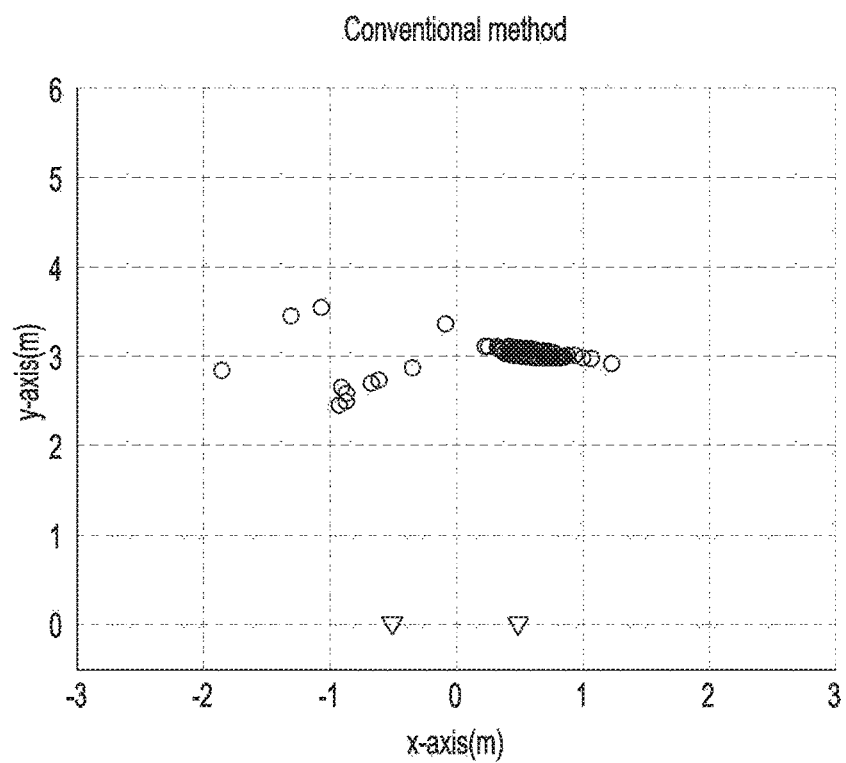
FIG. 10B is a view illustrating data about a location of a target obtained by a locator according to an embodiment of the disclosure.

FIG. 10A is a view illustrating data about a location of a target obtained by a locator according to an embodiment of the disclosure. FIG. 10B is a view illustrating data about a location of a target obtained by a locator according to an embodiment of the disclosure. It can be seen from FIG. 10A that relatively less position errors occur due to a false alarm, compared with FIG. 10B.

Figure 11A:
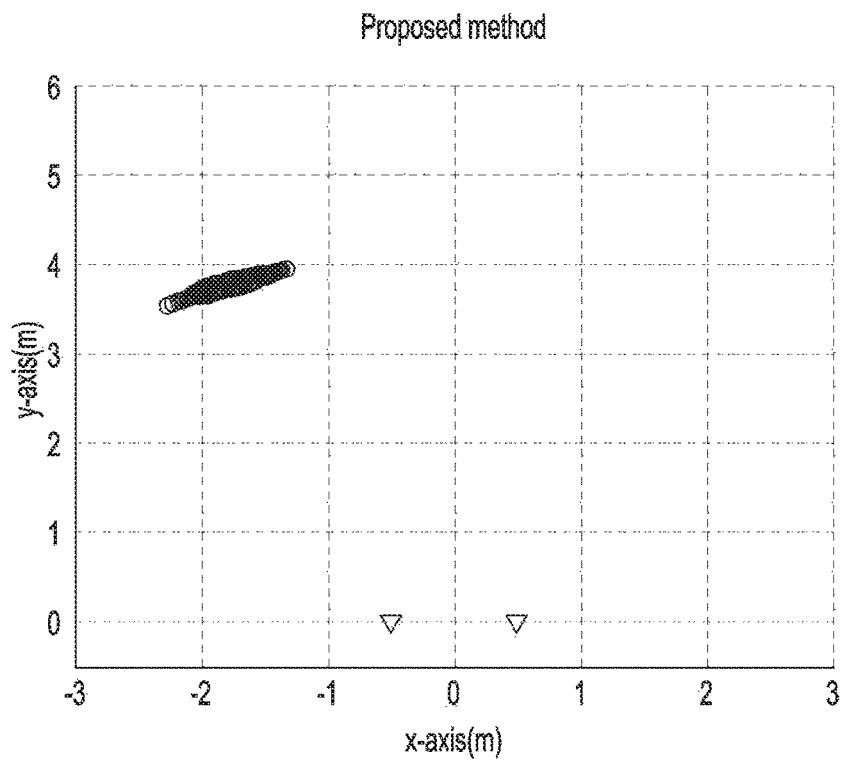
FIG. 11A is a view illustrating data about a location of a target obtained by a locator according to an embodiment of the disclosure.
Figure 11B:
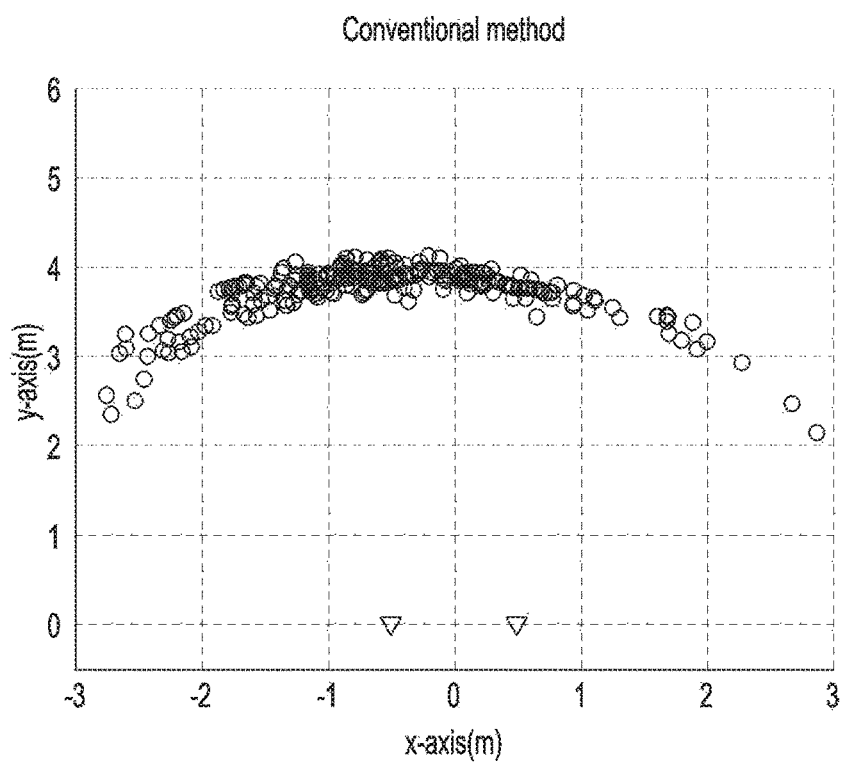
FIG. 11B is a view illustrating data about a location of a target obtained by a locator according to an embodiment of the disclosure.

FIG. 11A is a view illustrating data about a location of a target obtained by a locator according to an embodiment of the disclosure. FIG. 11B is a view illustrating data about a location of a target obtained by a locator according to an embodiment of the disclosure. The distance between a locator and a target in an experimental environment as shown in FIGS. 11A and 11B may be large than the locator-target distance in an experimental distance as shown in FIGS. 10A and 10B. It may be verified from FIG. 11B that position candidates are relatively more than those shown in FIG. 11A, and that the locator, according to an embodiment of the disclosure, is robust in detecting the position of a remote target as well.

According to various embodiments of the disclosure, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

According to an embodiment of the disclosure, there is provided a storage medium storing commands that are executed by at least one processor to enable the at least one processor to perform at least one operation that comprises creating a first clutter map representing a reflection characteristic of an object positioned around the wireless power transmitter based on, at least, first data obtained during a first period and storing the first clutter map, comparing a difference between the first clutter map and second data obtained during a second period with data contained in the first clutter map and creating a second clutter map corresponding to the second period based on a result of the comparison, determining a position of an organism using the second data and the second clutter map, and producing an RF wave for charging the electronic device while preventing a designated magnitude or more of RF waves from being produced in the position of the organism.

According to an embodiment of the disclosure, there is provided a storage medium storing commands that are executed by at least one processor to enable the at least one processor to perform at least one operation that comprises creating a first clutter map representing a reflection characteristic of an object positioned around a locator based on, at least, first data obtained during a first period, comparing a difference between the first clutter map and second data obtained during a second period with data contained in the first clutter map and creating a second clutter map corresponding to the second period based on a result of the comparison, and determining the position of the target using the second data and the second clutter map.

As is apparent from the foregoing description, according to various embodiments, there may be provided wireless power transmitters capable of locating an organism by comparing a clutter map, which is updated at each cycle, with signals received, thereby performing control to avoid relatively strong RF waves from being applied to the determined location of the organism and methods for operating the same.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wireless power transmitter configured to wirelessly transmit power to an electronic device, the wireless power transmitter comprising:
    a power transmission antenna including a plurality of patch antennas for wirelessly transmitting power based on a radio frequency (RF) wave;
    a sensor, and
    a processor, wherein the processor is configured to:
        create a first clutter map representing a reflection characteristic of an object positioned around the wireless power transmitter based on, at least, first data obtained by the sensor during a first period,
        store the first clutter map,
        compare a difference between the first clutter map and second data obtained by the sensor during a second period with data contained in the first clutter map,
        create a second clutter map corresponding to the second period based on a result of the comparison,
        determine a position of an organism using the second data and the second clutter map, and
        control the power transmission antenna such that a magnitude of the RF wave is less than a predetermined value based on the position of the organism.

2. The wireless power transmitter of claim 1, wherein the processor is further configured to:
    when a difference between a first component of the second data and a first component of the first clutter map is smaller than a product of the first component of the first clutter map and a designated first value, determine a value of a first component of the second clutter map as a value of the first component of the second data.

3. The wireless power transmitter of claim 1, wherein the processor is further configured to:
    when a difference between a second component of the second data and a second component of the first clutter map is larger than a product of the second component of the first clutter map and a second value, determine a value of a second component of the second clutter map as a value of the second component of the first clutter map.

4. The wireless power transmitter of claim 1, wherein the processor is further configured to:
    when a difference between a third component of the second data and a third component of the first clutter map is not less than a product of the third component of the first clutter map and a designated first value or a difference between a third component of the second data and the third component of the first clutter map is not more than a product of the third component of the first clutter map and a second value, determine a value of a third component of the second clutter map using the third component of the first clutter map and the third component of the second data.

5. The wireless power transmitter of claim 4, wherein the processor is further configured to:
determine the value of the third component of the second clutter map as a sum of a product of the third component of the first clutter map and a designated third value and a product of the third component of the second data and the designated third value minus one.

6. The wireless power transmitter of claim 1, wherein the processor is further configured to:
perform a frame stitching process on the first data and the second data.

7. The wireless power transmitter of claim 6, wherein the processor is further configured to:
perform bandpass filtering on the frame-stitched first data and the frame-stitched second data.

8. The wireless power transmitter of claim 7, wherein the processor is further configured to:
cross-correlate the filtered first data and the filtered second data and determine the position of the organism using the cross-correlated second data and the second clutter map.

9. The wireless power transmitter of claim 1, wherein the processor is further configured to:
obtain target data by subtracting the second clutter map from the second data and determine the position of the organism based on a position of a peak with a designated threshold or more in each of components of the target data.

10. The wireless power transmitter of claim 9, wherein the processor is further configured to:
identify a position of a peak corresponding to the first period and adjust values of the components of the target data of the identified position of the peak corresponding to the first period.

11. A method for operating a wireless power transmitter configured to wirelessly transmit power to an electronic device, the method comprising:
creating a first clutter map representing a reflection characteristic of an object positioned around the wireless power transmitter based on, at least, first data obtained during a first period;
storing the first clutter map;
comparing a difference between the first clutter map and second data obtained during a second period with data contained in the first clutter map and creating a second clutter map corresponding to the second period based on a result of the comparison;
determining a position of an organism using the second data and the second clutter map; and
producing an RF wave for charging the electronic device such that a magnitude of the RF wave is less than a predetermined value based on the position of the organism.

12. The method of claim 11, wherein the creating of the second clutter map is configured to, when a difference between a first component of the second data and a first component of the first clutter map is smaller than a product of the first component of the first clutter map and a designated first value, determine a value of a first component of the second clutter map as a value of the first component of the second data.

13. The method of claim 11, wherein the creating of the second clutter map is configured to, when a difference between a second component of the second data and a second component of the first clutter map is larger than a product of the second component of the first clutter map and a second value, determine a value of a second component of the second clutter map as a value of the second component of the first clutter map.

14. The method of claim 11, wherein the creating of the second clutter map is configured to, when a difference between a third component of the second data and a third component of the first clutter map is not less than a product of the third component of the first clutter map and a designated first value or a difference between a third component of the second data and the third component of the first clutter map is not more than a product of the third component of the first clutter map and a second value, determine a value of a third component of the second clutter map using the third component of the first clutter map and the third component of the second data.

15. The method of claim 14, wherein the creating of the second clutter map is configured to determine the value of the third component of the second clutter map as a sum of a product of the third component of the first clutter map and a designated third value and a product of the third component of the second data and the designated third value minus one.

16. The method of claim 11, further comprising performing a frame stitching process on the first data and the second data.

17. The method of claim 16, further comprising performing bandpass filtering on the frame-stitched first data and the frame-stitched second data.

18. The method of claim 17, further comprising cross-correlating the filtered first data and the filtered second data, wherein determining the position of the organism includes determining the position of the organism using the cross-correlated second data and the second clutter map.

19. The method of claim 11, wherein the determining of the position of the organism includes obtaining target data by subtracting the second clutter map from the second data and determining the position of the organism based on a position of a peak with a designated threshold or more in each of components of the target data.

20. The method of claim 19, wherein the determining of the position of the organism based on the position of the peak with the designated threshold or more in each of the components of the target data includes identifying a position of a peak corresponding to the first period and adjusting values of the components of the target data of the identified position of the peak corresponding to the first period.

21. An electronic device configured to determine a position of a target, the electronic device comprising:
a first antenna configured to transmit a first transmit signal;
a second antenna configured to receive a first receive signal formed by reflection of the first transmit signal; and
a processor, wherein the processor is configured to:
create a first clutter map representing a reflection characteristic of an object positioned around the locator based on, at least, first data obtained through the second antenna during a first period, store the first clutter map, compare a difference between the first clutter map and second data obtained through the second antenna during a second period with data contained in the first clutter map, create a second clutter map corresponding to the second period based on a result of the comparison, and determine the position of the target using the second data and the second clutter map.

22. A method for operating an electronic device configured to determine a position of a target, the method comprising:

creating a first clutter map representing a reflection characteristic of an object positioned around the locator based on, at least, first data obtained during a first period;

comparing a difference between the first clutter map and second data obtained during a second period with data contained in the first clutter map and creating a second clutter map corresponding to the second period based on a result of the comparison; and determining the position of the target using the second data and the second clutter map.

* * * * *